G. E. WALLER.
WHIFFLETREE HOOK.
APPLICATION FILED MAR. 12, 1915.
1,226,423. Patented May 15, 1917.
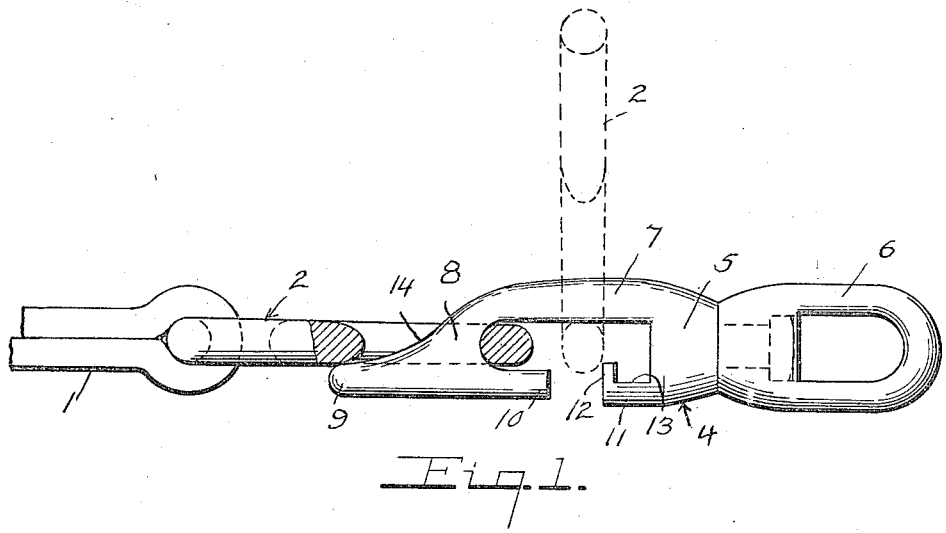
Fig. 1.
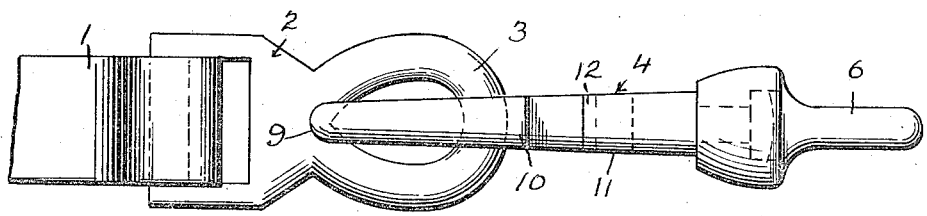
Fig. 2.
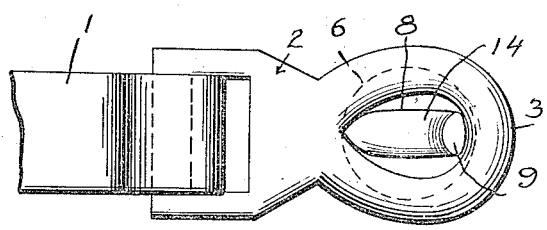
Fig. 3. G. E. Waller.

UNITED STATES PATENT OFFICE.

GROVER E. WALLER, OF LAVERNE, OKLAHOMA.

WHIFFLETREE-HOOK.

1,226,423.　　　　　Specification of Letters Patent.　　Patented May 15, 1917.

Application filed March 12, 1915. Serial No. 13,879.

*To all whom it may concern:*

Be it known that I, GROVER E. WALLER, a citizen of the United States, residing at Laverne, in the county of Harper and State of Oklahoma, have invented certain new and useful Improvements in Whiffletree-Hooks; and I do hereby declare the following to be a full, clear, and exact description of the invention, such as will enable others skilled in the art to which it appertains to make and use the same.

This invention relates to new and useful improvements in whiffletree hooks, and has for its principal object to provide a whiffletree hook which will prevent the traces or tugs from becoming disengaged.

Another object of the invention is to provide a device which will effectively lock the cockeye and prevent the same from becoming unhooked when the device is in use.

Still another object of the invention is to provide a means for holding the traces in operative position so that they may be easily and quickly unhitched should the user so desire.

With these and other objects in view, the invention consists in the combination and arrangement of parts which will be fully set forth in the following specification and in the accompanying drawing, in which:—

Figure 1 is a top plan view of a trace hook constructed in accordance with this invention.

Fig. 2 is an inside view thereof, and

Fig. 3 is a detail end view illustrating the device as it would appear with the trace ready to be removed.

Referring now to the drawings by characters of reference, the numeral 1 designates the trace provided with the usual cockeye designated generally by the numeral 2. This cookeye is provided with the usual loop 3 which is arranged to engage the trace-hook designated generally by the numeral 4.

The trace hook 4 hereinbefore referred to comprises the main body 5 having formed thereon a reduced extension provided with a head at its free end which is to retain the swivel connection 6 in operative position. This body is provided with the reduced extension 7 which terminates at its end in the angular projection 8, the free end of which, is provided with the forward extension 9. A rearward extension 10 is also formed on the end of the angular extension 8 and this extension 10 is arranged to form the hook which retains the cockeye in place. Extending forwardly and in parallel relation with the extension 7 is the projection 11, which is provided at its free terminal with the hook 12, this hook 12 is spaced from the end of the extension 10 as clearly shown and this space is arranged to permit the cockeye to be slipped from its position on the trace-hook. It will thus be seen that a chamber 13 is formed between the body 5 and the hook 12, and this chamber is arranged to receive the cockeye when the trace is in its rearmost position.

The wall of the extension 8 where it joins the projection 7, is preferably shaped as at 14 to form a cam surface, which normally tends to force the cockeye into the position illustrated in Fig. 1.

It will be apparent from the foregoing, that in use the swivel connection 6 is secured to the swingletree in the usual manner and the cockeye which is secured to the trace is then slipped in position as illustrated in the dotted lines in Fig. 1. The same is then passed forwardly and swung into the position shown in the full line, and it will thus be seen, that the device may be easily and quickly hooked in place. Should the trace slacken and the cockeye slide rearwardly, it will be evident that it will be prevented from becoming loosened through the angular projection 12, which will effectively engage the same and lock it firmly in position, and thereby prevent the device from being accidentally displaced.

From the foregoing, it will be apparent that a particularly simple and effective trace-hook is provided which will prevent the traces from becoming accidentally displaced and yet one is provided which will permit the said traces to be easily and quickly unhitched when so desired.

While in the foregoing, there has been shown and described the preferred embodiment of this invention, it is to be understood that such changes in the combination and arrangement of parts as may fall within the scope of the claim may be resorted to without departing from the spirit and scope of the invention.

Having thus described the invention, what is claimed as new, is:—

A whiffletree hook comprising a body, a reduced extension formed on the upper portion of said body, an angular projection formed on said extension, a forwardly extending arm and a rearwardly extending arm formed on the free end of said angular projection, a forwardly extending arm formed on the lower portion of said body and lying in parallel relation with the upper extension on said body, forming a chamber between said arms, said arm formed on the lower portion of said body lying in spaced relation to said rearwardly extending arm on said angular projection, thereby forming an entrance opening to said chamber, and an upwardly extending finger formed on the free end of said arm formed on the lower portion of said body, thereby providing a guide to said chamber, and a stop to limit the inward movement of a cockeye.

In testimony whereof I affix my signature in presence of two witnesses.

GROVER E. WALLER.

Witnesses:
C. F. WM. TISHTER,
RESSA SHIRLEY.

Copies of this patent may be obtained for five cents each, by addressing the "Commissioner of Patents, Washington, D. C."